(12) United States Patent
Rao (10) Patent No.: US 9,664,020 B1
(45) Date of Patent: *May 30, 2017

(54) WATER SOLUTION SYSTEM

(71) Applicant: Elwood Leonard Rao, Plano, TX (US)

(72) Inventor: Elwood Leonard Rao, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/636,853

(22) Filed: Mar. 3, 2015

Related U.S. Application Data (60) Provisional application No. 62/078,514, filed on Nov. 12, 2014.

(51) Int. Cl.
*E21B 43/20* (2006.01)
*E03F 5/10* (2006.01)

(52) U.S. Cl.
CPC .............. *E21B 43/20* (2013.01); *E03F 5/103* (2013.01)

(58) Field of Classification Search
CPC ... B01D 21/00; B01D 3/16; C02F 1/00; C02F 2103/007
USPC ......................................................... 210/739
See application file for complete search history.

(56) References Cited

U.S. PATENT DOCUMENTS

| | | | | |
|---|---|---|---|---|
| 2012/0253530 | A1* | 10/2012 | Malsam | A01G 25/09 700/284 |
| 2013/0048575 | A1* | 2/2013 | Gruber | C02F 1/24 210/749 |
| 2013/0290066 | A1* | 10/2013 | Altamirano | G06Q 10/0633 705/7.27 |

* cited by examiner

*Primary Examiner* — Robert Clemente
*Assistant Examiner* — Akash Varma
(74) *Attorney, Agent, or Firm* — Eldredge Law Firm; Richard G. Eldredge (57) ABSTRACT

A water system for a hydraulic frac station. The water system includes a water source, a water retention pit, a pump, a riser station, and a water recycling system. The pump is configured to channel water from the retention pit to the riser station and to the hydraulic frac station. The water from the retention pit is channeled to the hydraulic frac station, which in turn is channeled to the recycling system via the riser station.

12 Claims, 14 Drawing Sheets

WATER SOLUTION SYSTEM

BACKGROUND

1. Field of the Invention

The present invention relates generally to the oil and gas industry, and more specifically to water pumping systems.

2. Description of Related Art

Figure 1:
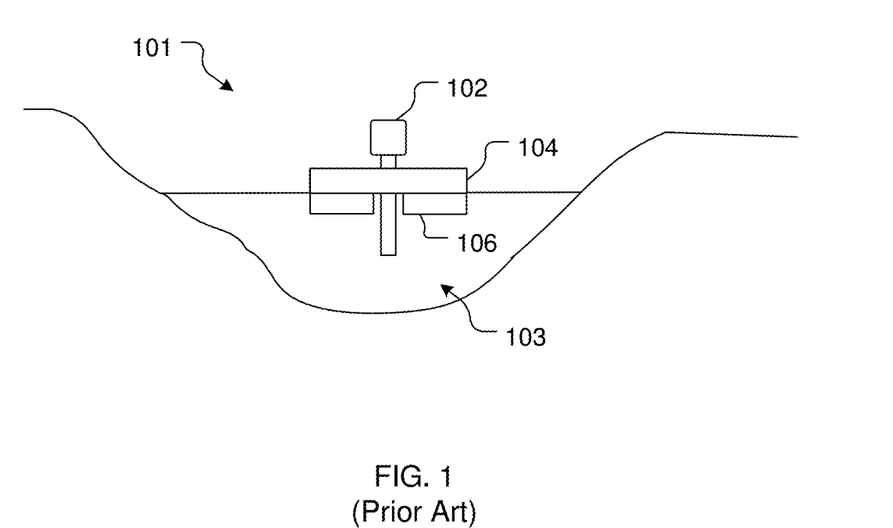
FIGS. 1-3 are side views of a conventional floating water pump system.

Floating systems for pumping water in the mining, irrigation, and dredging industries are well known in the art and are effective means for supplying water during operation. In FIG. 1, a side view of a conventional floating water pump system 101 is shown. During use, the pump system floats in a fluid reservoir 103 and transfers the water to one or more systems or devices used during operation. It will be appreciated that reservoir 103 may be either natural or man-made. In the exemplary embodiment, the system 101 includes a pump 102 configured to channel fluid from reservoir 103 through a hose (not shown) to one or more systems needing the fluid. The pump 102 is secured to a frame 104, which in turn floats on the fluid reservoir via a plurality of floatation devices 106. It should be understood that the pump 102 is configured to be rigidly attached to the frame in the upright position.

Figure 2:
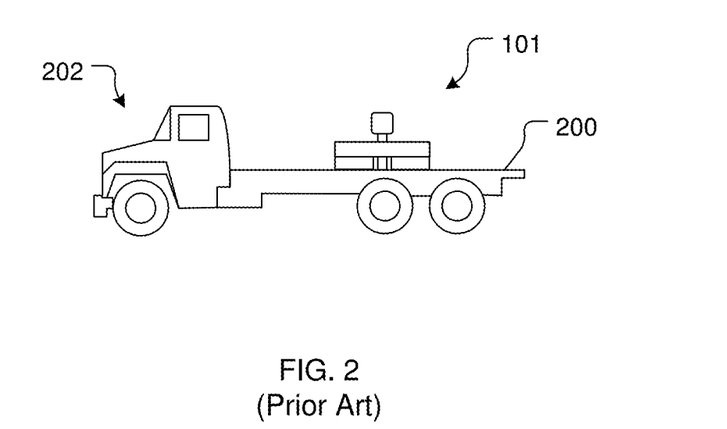
Figure 3:
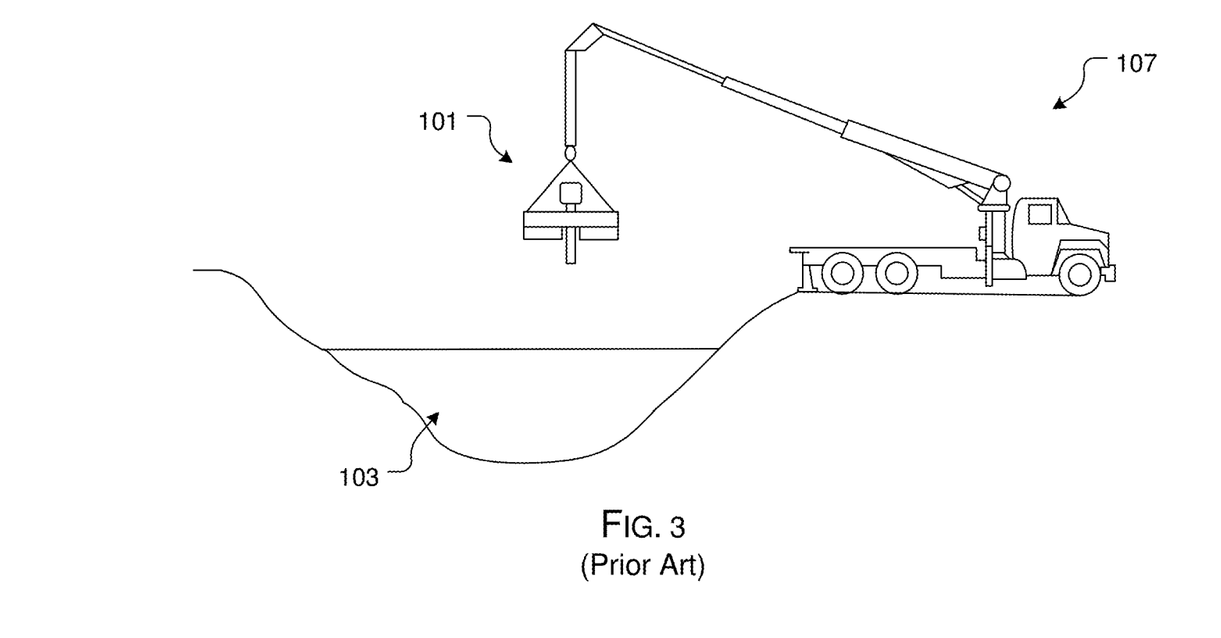

In FIG. 2, a side view of the system 101 is shown secured to the flatbed 200 of truck 202 and ready for transport. It should be understood that system 101 requires the use of heavy duty transport vehicles, for example, a semi-truck. It should be understood that extensive costs and time is exhausted during the preparation and transport of pump system 101. As depicted in FIG. 3, a side view of the pump system 101 is shown being lowered in the fluid reservoir 103 via a crane 107 operably associated with the vehicle.

A common disadvantage with conventional floating water pump systems exists. For example, the conventional pump systems are top heavy due to rigidly attached pump relative to the frame. It is also difficult to transport the pump system due to the positioning of the pump relative to the platform. Further, the conventional pump system requires the use of a crane and/or other similar means to lift and lower the pump system in the fluid reservoir. The conventional pumps do not have wheels, thereby greatly reducing the mobility of the pump systems. These and other problems are common with conventional pump systems described above.

Although great strides have been made in the area of floating water pump systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional systems. Specifically, one of the unique features of the pump system is the use of wheels that allow the pump to easily and readily be transported in the fluid reservoirs. The pump system also includes the features of allowing the pump to pivot relative to the platform, thus increasing the ease of transport and to allows the pump to be used in shallower fluid reservoirs than conventional pump systems. The pump system is configured to lock in a relatively horizontal position during transport, while the legs are configured to retract, which in turn reduces the systems vertical footprint and lowers its center of mass. It should be understood that a decreased vertical footprint facilitates transportation efforts and enables the system to function in shallower bodies of water. Also, to facilitate installation efforts, the legs can be locked into an extended position and the system rolled into a pumping site. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 4:
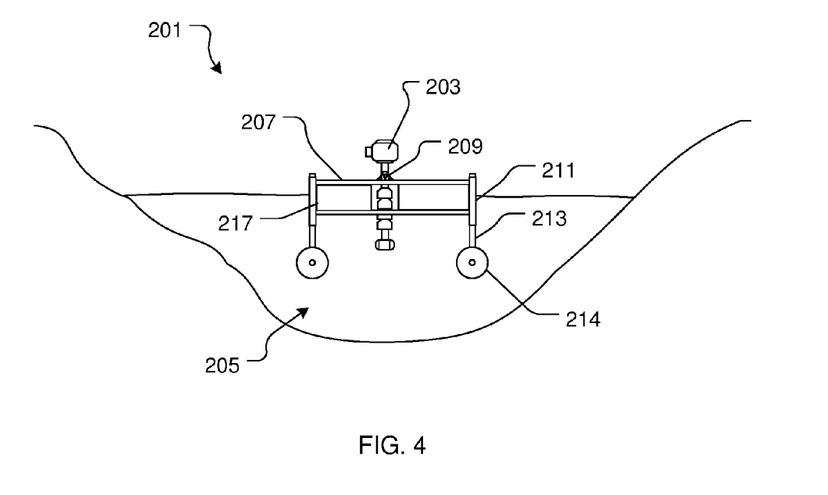
FIG. 4 is a side view of a pump system in accordance with a preferred embodiment of the present application.

Referring now to the drawings wherein like reference characters identify corresponding or similar elements throughout the several views, FIG. 4 depicts a side view of the pump system 201 in accordance with a preferred embodiment of the present application. It will be appreciated that the system 201 overcomes at least one of the above-listed problems commonly associated with floating water pump systems.

In the contemplated embodiment, system 201 preferably includes one or more of a motor and pump assembly 203 suspended over a fluid reservoir 205 by a barge 207. In the preferred embodiment the motor and pump assembly 203 is pivotally attached to the barge frame 207 via a pivot joint 209. The barge frame 207 also includes a wheel housing 211 configured to receive a wheel post 213. The wheel housing 211 is rigidly attached to the barge frame 207, which in the preferred embodiment, includes four wheel housings along with associated wheels. The barge frame 207 is configured to secure to one or more floatation devices 217 configured to float system 201. A plurality of wheels 214 are attached to each post 213 and provide means to transport pump system 201 in the reservoir in addition to providing stability during flotation.

Figure 5:
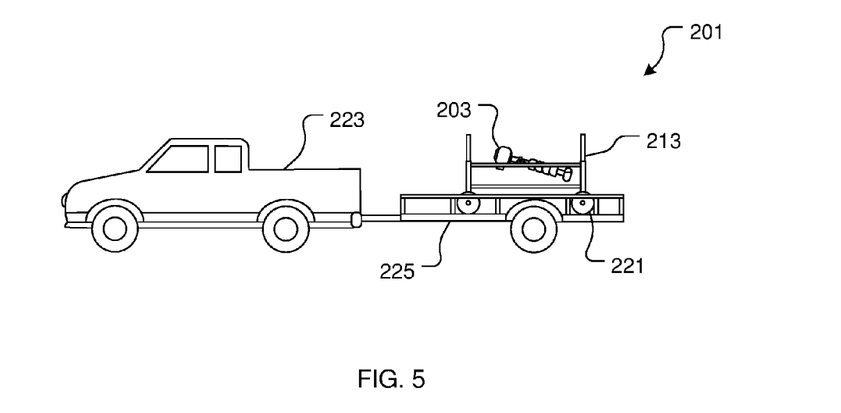
FIG. 5 is a side view of the pump system of FIG. 4 in during transport mode.
Figure 6:
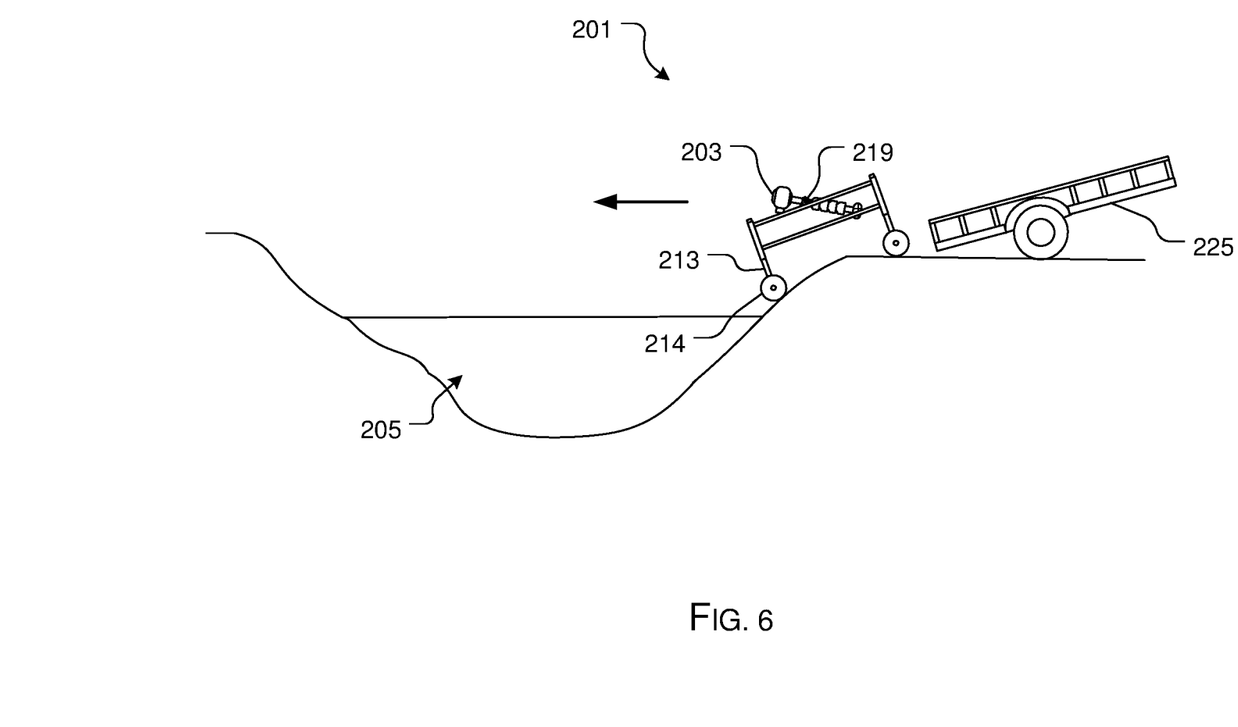
FIG. 6 is a side view of the pump system of FIG. 4 during installation mode.

As depicted in FIGS. 5 and 6, the wheels are shown as beneficial features of the pump system 201. Specifically, the retractable posts 213 of the wheels allow the pump system 201 to easily be stored on a utility trailer during transport in the retracted position, while also allowing the pump system to be rolled to the fluid reservoir in the extended position.

In one contemplated method of use, the pivotally attached motor and pump assembly 203 is locked in a more horizontal position and the wheel posts 213 are in a retracted position collapsed state 221. This feature provides significant advantages, namely, the center of mass of system 201 is lowered and its vertical footprint is decreased. It will be appreciated that a decreased center of mass and vertical footprint facilitates transportation via a truck 223 and trailer 225. It will also be appreciated that a lower vertical footprint enables the pump assembly 203 to function at shallower depths.

In a second contemplated method of use, the pivotally attached motor and pump assembly 203 is locked in a more horizontal position 219 and the wheel posts 213 are in an extended state. This feature provides significant advantages, namely, increasing the bottom clearance of system 201. It will be appreciated that an increased bottom clearance facilitates the deployment of system 201 as it is rolled from a trailer 225 into a body of water 205. These features are illustrated in FIGS. 4-6 of the present application.

Although only the above features are shown, it will be appreciated that more or less features are also contemplated in alternative embodiments. It will also be appreciated that alternate configurations to accommodate heavy or uniquely shaped equipment are contemplated in alternative embodiments.

Figure 7A:
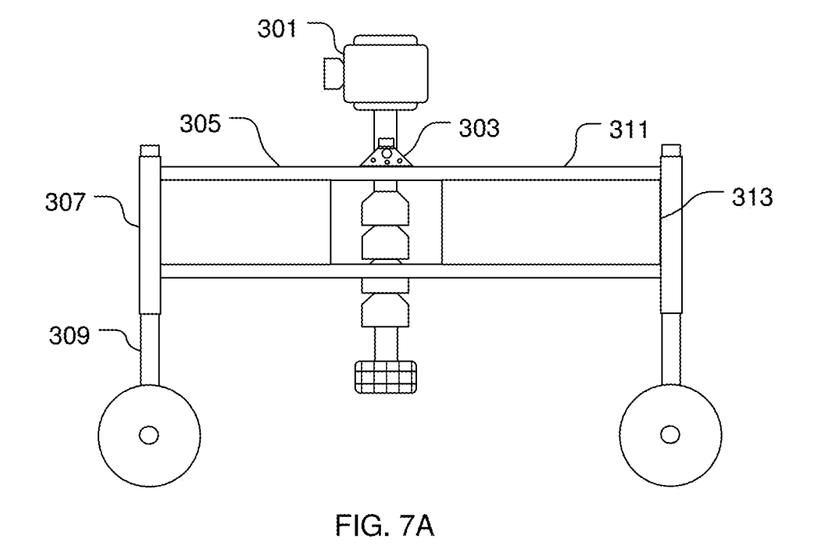
FIGS. 7A and 7B are side views of the pump system of FIG. 4.
Figure 7B:
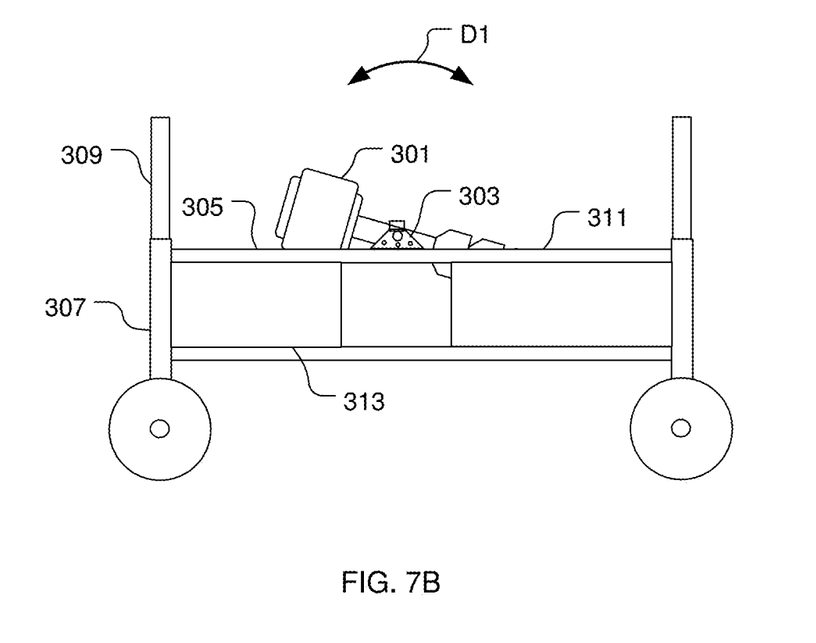

FIG. 7A shows a side view of system 201 in a fully extended position. As discussed, the motor and pump assembly 301 is pivotally attached 303 to a barge 305 with a frame 307 that carries collapsible wheel posts 309, a float containment frame 311, and one or more floats 313. FIG. 7B shows a side view of system 201 in a fully collapsed position.

Figure 8A:
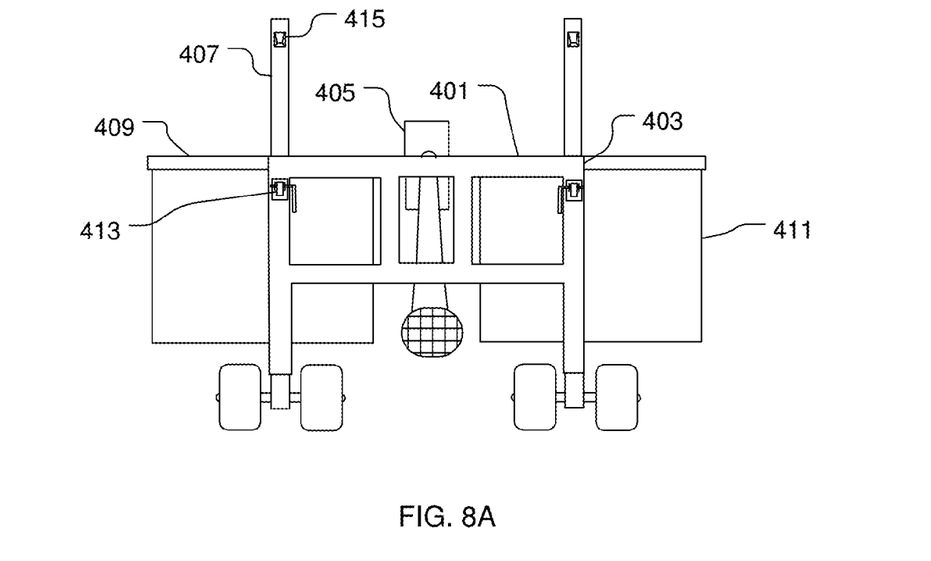
FIGS. 8A and 8B are front views of the pump system of FIG. 4.
Figure 8B:
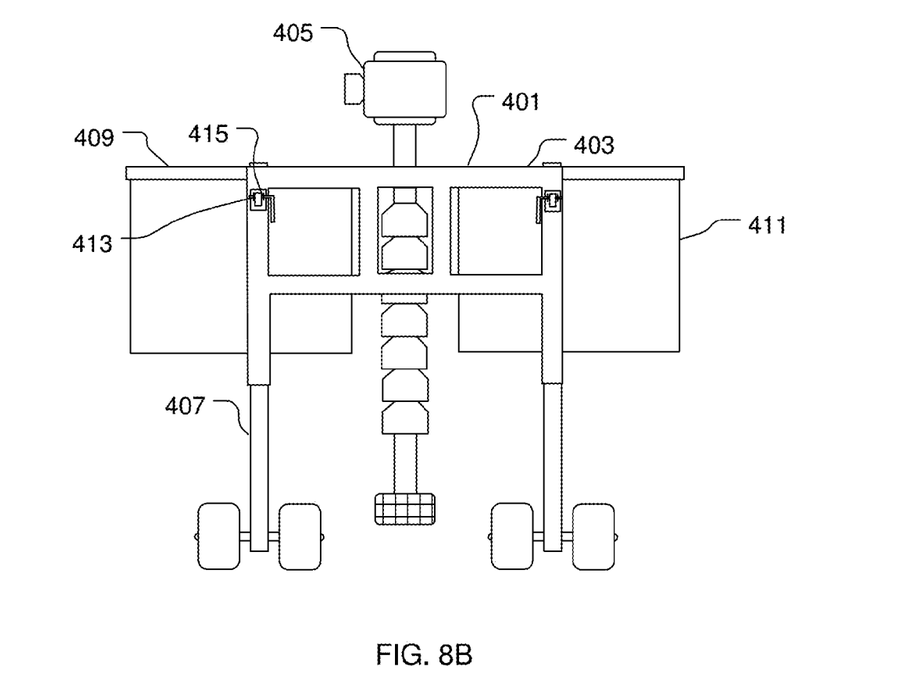

FIG. 8A shows a back view of system 201 in a fully collapsed position. As discussed, the barge 401 includes a frame 403 that carries the motor and pump assembly 405, collapsible wheel posts 407, a float containment frame 409, and one or more floats 411. FIG. 8B shows a back view of system 201 in a fully extended position. The frame 403 and collapsible wheel posts 407 and also carry a locking mechanism 413 and catch 415 such that the wheel posts 407 automatically extend to the catch 415 when system 201 is placed in a body of water. It should be appreciated that an automatically extending wheel post provides an advantage when deploying/installing the system 201.

Figure 9:
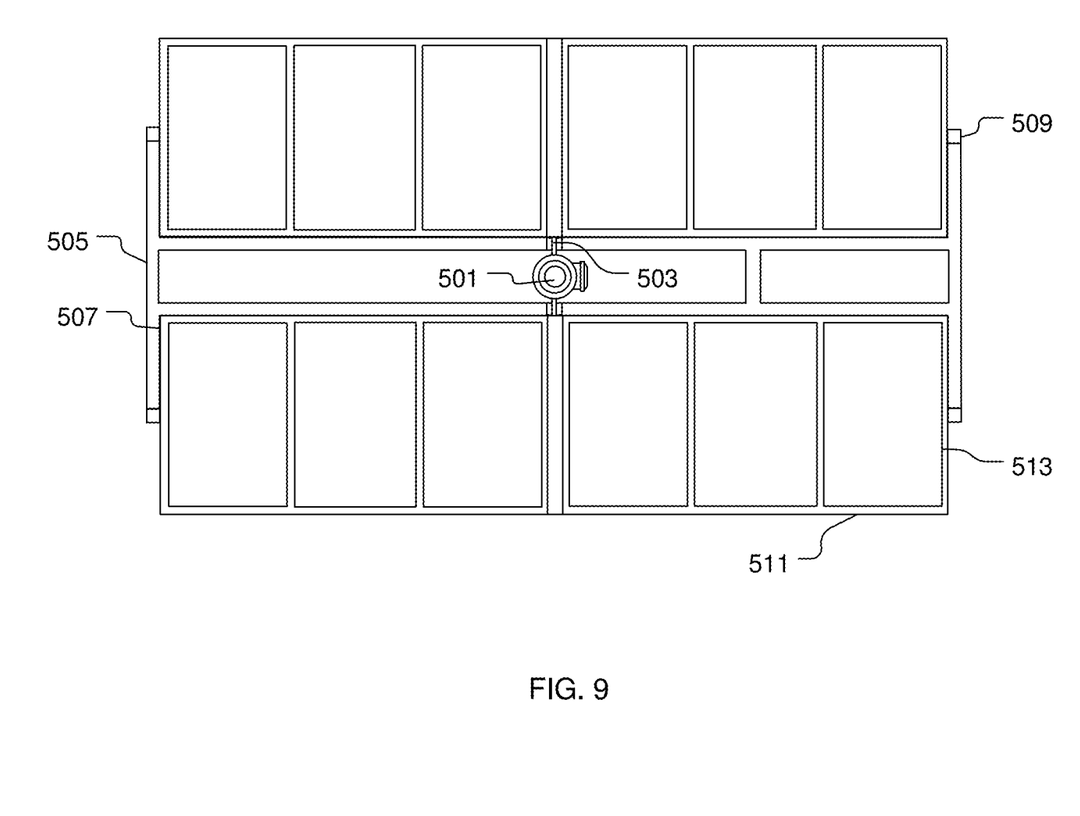
FIG. 9 is a top view of the pump system of FIG. 4.

FIG. 9 shows a back view of system 201. As discussed, system 201 includes a motor and pump assembly 501 pivotally attached 503 to a barge 505 with a frame 507 that carries the collapsible wheel posts 509, a float containment frame 511, and one or more floats 513.

A unique feature and advantage of the present application is the ability to change and lock the angle at which the motor and pump assembly 301 is carried by the barge 305. This advantage facilitates transportation, deployment/installation, and maintenance Another unique feature and advantage of the present application is the ability to extend or reduce the height of system 201 by extending or collapsing the wheel posts 309.

Figure 10A:
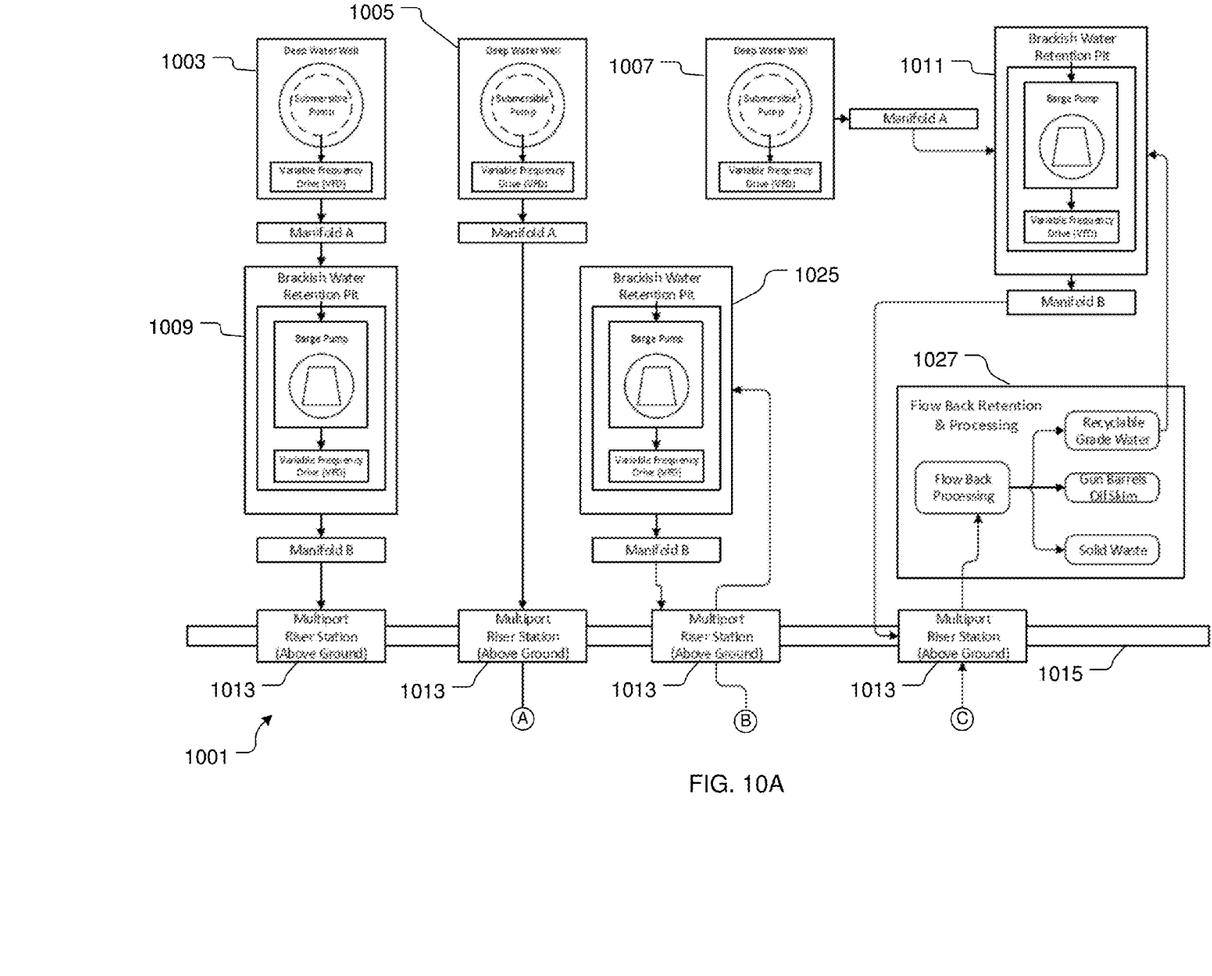
FIGS. 10A and 10B are simplified schematics of a pump system process in accordance with a preferred embodiment of the present application.
Figure 10B:
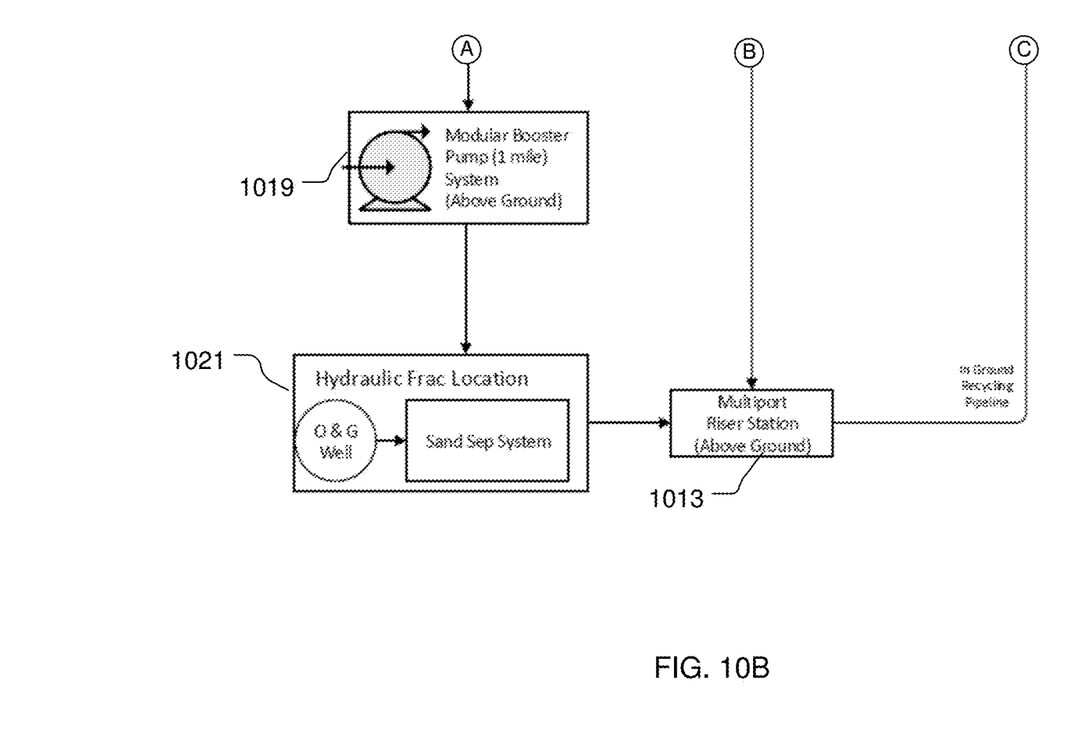

Referring now to FIGS. 10A and 10B in the drawings, a simplified flowchart of the preferred water solution system is shown. It will be appreciate that the features discussed above with reference to pump system 201 are hereby incorporated in the system 1001 discussed herein. It will be appreciated that one of the unique features believed characteristic of system 1001 is the ability to reclaim and reuse water from a frac site. It should be understood that a frac well could use up to 100,000 barrels of water during operation. In lieu of disposing of the used water, the system 1001 of the present application is configured to reclaim and reuse the water. These features are discussed below and shown in the accompanying drawings.

One of the unique features of system 1001 is the method of obtaining the water. In one embodiment, the system 1001 could obtain the water from a conventional means, such as, a water well, river, pond, the frac pit, and/or other suitable sources. It will be appreciated that system 1001 could also obtain the water from unconventional sources such as wastewater from paper mills, chemical plants, flowback from the oil and gas field, and other similar unconventional water reservoirs.

As will be discussed more fully below, the system 1001 includes a recycling feature, wherein the water from the conventional and unconventional water reservoirs are treated with chemical for repurposing the water; taking the water from a class 2 to a class 1, thereby maintaining the integrity of the brackish water already in the frac pits. The treatment process also includes skimming the oils from the treated water, which can thereafter be used to pay for the recycling process.

As depicted in FIG. 10A, system 1001 utilizes three or more deep water wells 1003, 1005, 1007 operably associated with submersible pumps and Variable Frequency Drives (VFDs). Although shown with three water wells, it will be appreciated that the features discussed herein could be used with more or less water wells or no water wells at all. In the contemplated embodiment, the three water wells 1003, 1005, 1007 depicted could be a single water well.

As will be discussed below, the pumps and VFDs associated with the water wells 1003, 1005, and 1007 allow the user to manipulate the water flow throughout the system, which in turn provides the desired flowrate of water to the frac pit and/or other locations. Additional VFDs are operably associated with the barge pumps, e.g., system 201, which preform substantially the same feature of providing a desired water flow rate.

As shown, the water from wells 1003, 1005, and 1007 are received through a manifold A operably associated with a multiport riser station 1013 (see, e.g., FIG. 15) in fluid communication with a central conduit 1015. The water from deep water wells 1003, 1007 are pumped directly to respective retention pits 1009, 1011 via a manifold A. A third retention pit 1025 is in fluid communication with the hydraulic frac station 1021 and riser station 1013. A transfer pump 1019 is used to drive the water from well 1005 to the hydraulic frac station 1021.

It will be appreciated that the pump system 201 discussed above can be operably associated with each retention pit 1009, 1025, 1011 to transfer water to the riser station 1013. Although shown as three separate retention pits, it will be appreciated that a single retention pit could be used in one of the preferred embodiments.

One of the unique features believed characteristic of the present application is the ability to reclaim and reuse the water from the hydraulic frac station 1021. This feature is achieved through a recycling center 1027, wherein water from the hydraulic frac station 1021 is processed. The process includes separating the water from solid waste, skimming the oil from the water, and treating the water with chemicals. The recyclable grade 1 water is then reused by channeling the recyclable grade water to the retention pit 1011, which in turn is transferred to manifold B of the riser station 1013.

The recycling features of center 1027 provides significant advantages, namely, reducing the amount of water needed to perform the frac operation, which in turn reduces the environmental impact and reduces costs.

It will be appreciate that the features of system 1001 could be used on various types of fluid systems and should not be limited to mining, irrigation, and dredging industries. For example, the process discussed above could be operably associated with fluid systems for municipalities. The pumps discussed herein should not be narrowed tailored to one type of pump, but it is contemplated using various types in the preferred and alternative embodiments.

Figure 11:
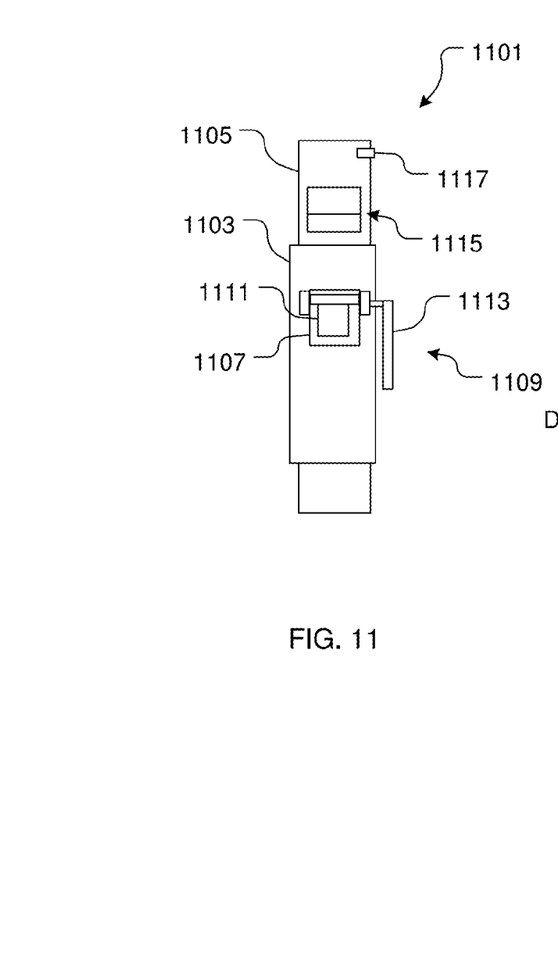
FIG. 11 is a front view of a locking mechanism of a pump system.
Figures 12A, 12B:
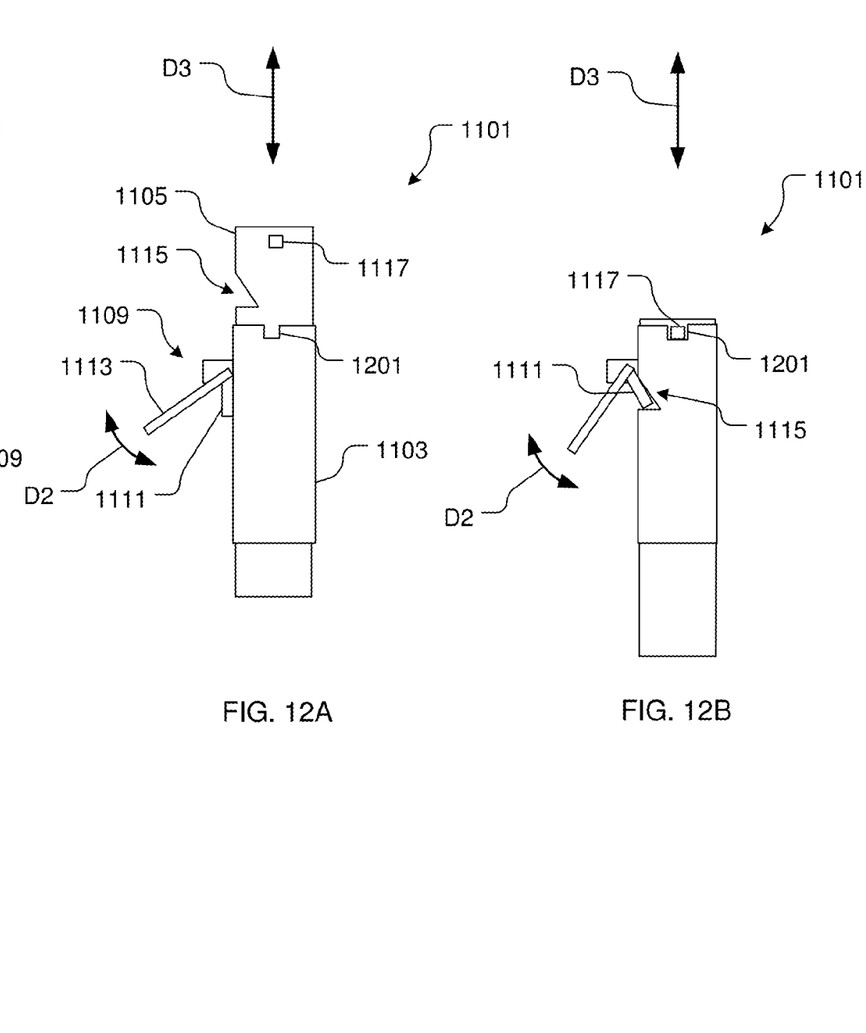
FIGS. 12A and 12B are side views of the locking mechanism of FIG. 11.

In FIGS. 11, 12A, and 12B, a leg locking device 1101 is depicted. In the contemplated embodiment, the locking device 1101 is configured to secure the leg 1105 in a fixed position relative to the frame via a housing 1103. Housing 1103 includes an opening 1107 operably associated with a lock 1109 having a lever 1113 and a locking mechanism 1111 configured to extend through opening 1107. The locking mechanism 1111 is configured to engage with an indentation 1115 of leg 1105. A ledge 1117 is also provided and engages with a slot 1201. During use, the lock 1109 is configured to pivot in direction D2 and the leg is configured to slide in direction D3.

Figures 13, 14:
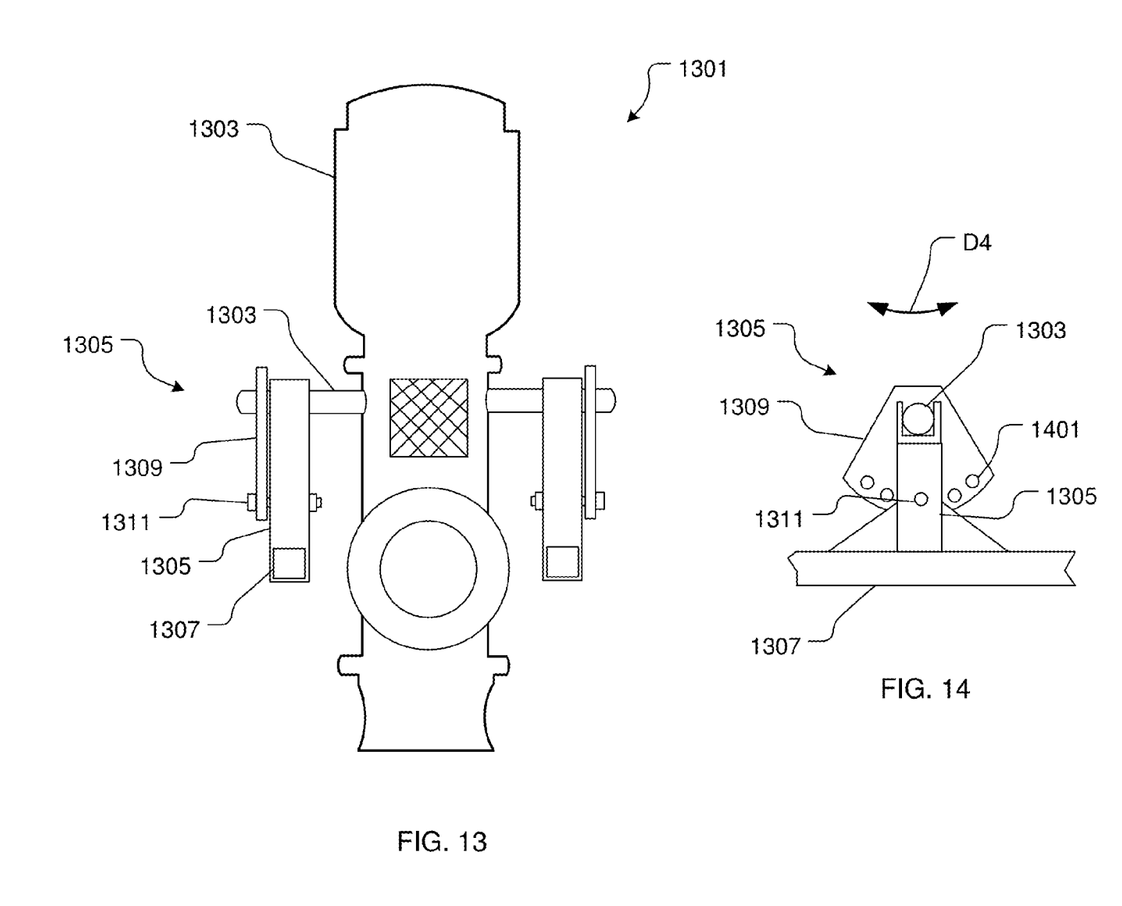
FIG. 13 is a front view of the pump of the pump system of FIG. 4.
FIG. 14 is a side view of the pump locking device.

In FIGS. 13 and 14, the pump locking device 1301 is shown operably associated with pump 1303. Device 1301 includes a rod 1303 configured to engage with the pump and a member 1305 which attaches to the frame 1307. The device 1303 includes a second member 1309 having a plurality of holes 1401 configured to engage with a pimp 1311. The locking device allows pivoting movement in direction D4.

Figure 15:
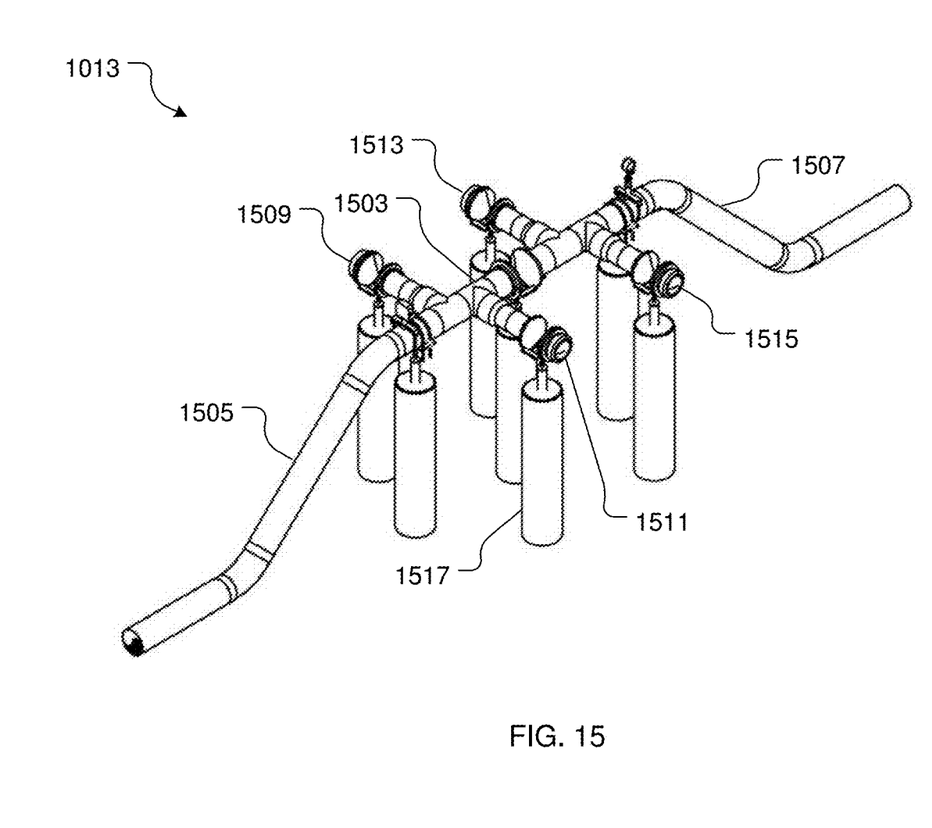
FIG. 15 is an oblique view of a multi-port camelback above-ground riser station.
Figure 16:
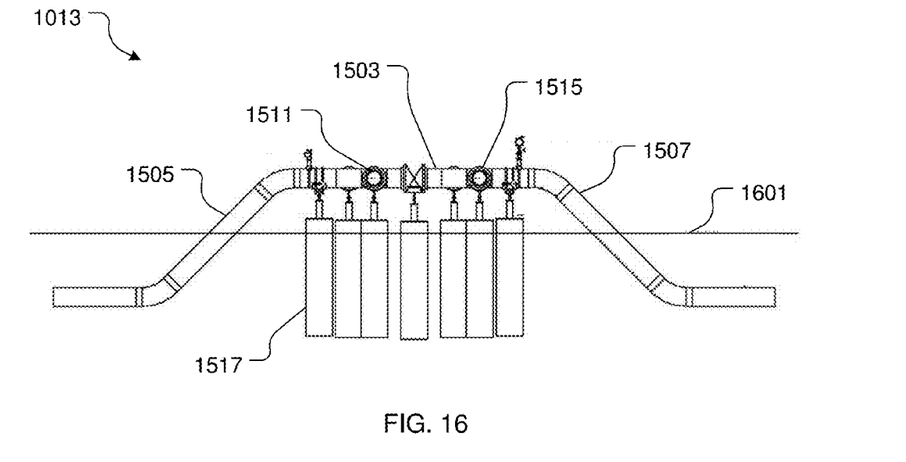
FIGS. 16 and 17 are respective side and top views of the riser station of FIG. 15.
Figure 17:
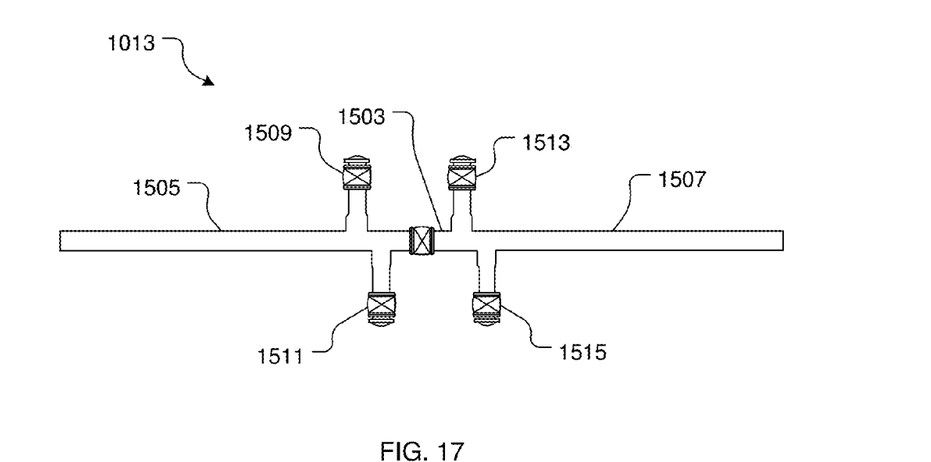

Referring now to FIGS. 15-17 in the drawings, various views of the riser station 1013 is shown operably associated with central conduit 1015, which includes a center conduit section 1503 joined between an input section 1505 and an output section 1507. In the contemplated embodiment, conduit section 1505 could be in fluid communication with one or more barge pumps 201 discussed above.

The station 1013 is further provided with a plurality of manifolds in fluid communication with central section 1503, specifically, manifold 1509, 1511, 1513, and 1515. The manifolds are adapted for use with conduits in fluid communication with the recycling center, frac pit, wells, and other operably associated water sources used to perform the frac operation. As depicted, each manifold is supported by a pillar 1517 configured to secure the station 1013 in a fixed position. Also, it will be appreciated that sections 1505 and 1507 are preferably bent to accommodate the elevated surface 1601 that the station 1013 rests thereon.

Figure 18:
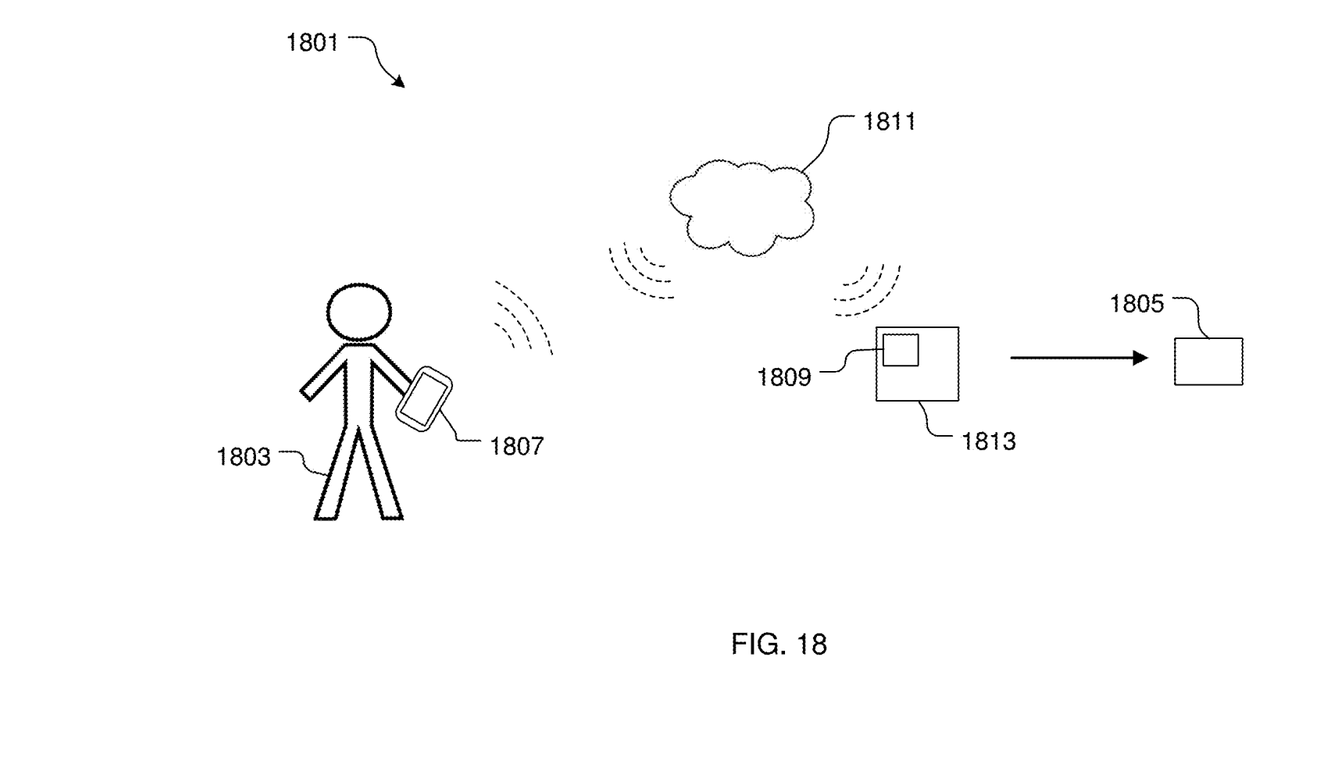
FIG. 18 is a simplified schematic of a control system operably associated with the pump system of FIG. 10A.

In FIG. 18, a simplified schematic of a control system 1801 is shown. One of the unique features believed characteristic of the present application is the ability to control the movement and quantity of water flowing through system 1501 via a control system 1801.

In the contemplated embodiment, a user 1803 is capable of controlling the flow of water through a conduit 1805 via a remote computer 1807. In one embodiment, computer 1807 is a smart phone; however, other remote devices, e.g., a tablet, laptop, and the like, could be used in alternative embodiments.

During use, the user 1803 manipulates computer 1807, which in turn wirelessly communicates with a receiver 1809 operably associated with one or more VFD controls 1813 via web 1811 and/or other wireless communication mediums. Although contemplated with cellular wireless data transmission, it will be appreciated that Bluetooth technology, WiFi, and/or other suitable means could be used in lieu of cellular communications.

Thus, system 1801 provides the user with an automated custom flow rate of the water through system 1501 with manipulation of the VFDs and pumps associated with system 1501.

It should be understood that the wheels facilitate both transportation and deployment. This feature is achieved by the capability of the system to roll off a utility trailer. Just as relevant are the wheels other purposes such as keeping the pump off of the bottom of the water reservoir to prevent the pump from sucking sediment. Thus, the wheels provide a necessary height relative to the floor of the fluid reservoir to prevent the unwanted suction of sediment. Further, the wheels act as a cushion to prevent the pump from tearing a poly liner on the bottom of a manmade reservoir.

Also, it should be understood that the pump pivot and locking mount apparatus allows the pump assembly to pivot and lock at various angles during pump operation to accommodate water depths. Moreover, the discharge head is of a custom designed from steel pipe with the pivot pins welded thereto in one contemplated embodiment.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A water system for a hydraulic frac station, the water system comprising:
    a water source;
    a water retention pit;
    a barge positioned within the retention pit, the barge having:
        a frame;
        a plurality of wheels extending from the frame; and
        a pump pivotally attached to the frame, the pump is configured to pivot from a first position to a second position relative to the frame;
    a riser station positioned a distance from the water retention pit, the riser station having:
        a first manifold with a first valve; and
        a second manifold with a second valve;
        wherein the first manifold is configured to receive water from the water retention pit via a first conduit, which in turn is in fluid communication with the pump carried on the barge; and
    a water recycling system in fluid communication with the second manifold of the riser station via a second conduit;
    wherein the pump is configured to channel water from the retention pit to the riser station and the hydraulic frac station via the first conduit;
    wherein water from the retention pit is channeled to the hydraulic frac station, which in turn is channeled to the recycling system via the riser station via the second conduit; and
    wherein the water recycling system is configured to treat the water from the hydraulic frac station.

2. The system of claim 1, further comprising:
    a variable frequency drive operably associated with the pump;
    wherein the variable frequency drive is configured to control a flow rate of the water channeled to the riser station and the retention pit.

3. The system of claim 2, further comprising:
    a remote control system operably associated with the variable frequency drive and configured to remotely control the flow rate of the water channeled to the riser station and the retention pit.

4. The system of claim 3, the remote control system having:
    a portable computer in data communication with a receiver operably associated with the variable frequency drive;
    wherein the portable computer is manipulated by a user.

5. The system of claim 4, wherein the portable computer is a smartphone.

6. The system of claim 1, wherein the water source is a water well.

7. The system of claim 1, wherein the water source is a waste water treatment reservoir.

8. The system of claim 1, wherein the water retention pit is composed of a plurality of dirt walls.

9. A method to recycle water from a hydraulic frac station, comprising:
    providing the system of claim 1;
    placing the barge in the water retention pit;
    pivoting the pump relative to the frame of the barge;
    obtaining water from the water source;
    storing water in the water retention pit;
    pumping water to the hydraulic frac station via the pump and riser station; and
    recycling used water from the hydraulic frac station with the recycling system;
    wherein water is recycled through the water retention pit and the hydraulic frac station; and
    wherein water from the water source is added to water recycled from the water retention pit.

10. The method of claim 9,
    varying a flowrate of water with a remote control system operably associated with the pump.

11. The method of claim 9, further comprising:
    treating water from the hydraulic frac station with chemicals prior to recycling the water to the water retention pit.

12. The method of claim 9, further comprising:
    skimming oil from water from the hydraulic frac station.

* * * * *